United States Patent
Droz et al.

(10) Patent No.: US 6,950,946 B1
(45) Date of Patent: Sep. 27, 2005

(54) DISCOVERING STOLEN OR LOST NETWORK-ATTACHABLE COMPUTER SYSTEMS

(75) Inventors: Patrick Droz, Glattbrugg (CH); Robert Haas, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/539,809

(22) Filed: Mar. 30, 2000

(30) Foreign Application Priority Data

Mar. 30, 1999 (EP) ................................ 99106466

(51) Int. Cl.⁷ .................. G06F 11/30; G06F 12/14; H04L 9/00; H04L 9/32
(52) U.S. Cl. ............... 713/201; 713/200; 713/150; 713/185; 340/825.36; 340/5.74; 340/426; 709/224; 709/246; 709/200; 379/40; 379/44; 379/51; 342/357.1; 380/255
(58) Field of Search ............... 340/426, 625.36, 340/825, 825.36, 5.74; 713/201, 200, 150, 713/185; 709/246, 200, 229, 224; 395/200.03; 379/40, 51, 94, 44; 342/357.1; 380/3, 4, 380/255

(56) References Cited

U.S. PATENT DOCUMENTS

| | | | |
|---|---|---|---|
| 5,748,084 A * | 5/1998 | Isikoff ...................... 340/568.1 |
| 5,862,335 A * | 1/1999 | Welch et al. ................ 709/224 |
| 5,896,497 A * | 4/1999 | Halstead ..................... 713/200 |
| 5,966,081 A * | 10/1999 | Chesnutt ..................... 340/5.64 |
| 5,986,543 A * | 11/1999 | Johnson .................. 340/426.19 |
| 6,021,493 A * | 2/2000 | Cromer et al. .............. 713/200 |
| 6,031,894 A * | 2/2000 | Fleming, III ................. 379/44 |
| 6,128,739 A * | 10/2000 | Fleming, III ................ 713/200 |
| 6,154,172 A * | 11/2000 | Piccionelli et al. ....... 342/357.1 |
| 6,244,758 B1 * | 6/2001 | Solymar et al. ............ 709/224 |
| 6,269,392 B1 * | 7/2001 | Cotichini et al. ........... 709/200 |
| 6,609,656 B1 * | 8/2003 | Elledge ....................... 235/382 |
| 6,667,688 B1 * | 12/2003 | Menard et al. .............. 340/531 |

FOREIGN PATENT DOCUMENTS

| | | | | |
|---|---|---|---|---|
| EP | 740037 A1 * | 10/1996 | ........... E05B 49/00 |
| EP | 0836131 | 4/1998 | |
| WO | 9615485 | 5/1996 | |
| WO | 9804967 | 2/1998 | |
| WO | 9806213 | 2/1998 | |

OTHER PUBLICATIONS

"Theft Protection for Network Attached Devices", IBM Technical Disclosure Bulletin vol. 39, No. 7, pp 271-272 (Jul. 1996).

* cited by examiner

*Primary Examiner*—Avaz Sheikh
*Assistant Examiner*—Shin-Hon Chen
(74) *Attorney, Agent, or Firm*—Louis Herzberg; Anne Vachon Dougherty

(57) ABSTRACT

A network-attachable computer system (40) that comprises a network interface for connection to a network (41), a server module address, a secure identifier (ID), and a key k. The computer system (40) generates identity information which comprises the secure identifier ID and which is protected using said key k. This identity information is automatically sent via the network interface to a server module (42) which is reachable via the network (41) by using said server module address where it is used to determine whether the respective computer system (40) is reported lost or stolen.

19 Claims, 2 Drawing Sheets

DISCOVERING STOLEN OR LOST NETWORK-ATTACHABLE COMPUTER SYSTEMS

FIELD OF THE INVENTION

The invention relates generally to computer systems that can be attached to a network and more particularly to a scheme for discovering stolen or lost network-attachable computer systems.

BACKGROUND OF THE INVENTION

Computer systems have become dramatically smaller and more portable. Personal computers and peripherals are small enough to sit on the desk at work. Smaller still are lap top computers and notebook computers. There are computer terminals which are small enough to be mounted in a vehicle such as a delivery truck. Still smaller are the hand held terminals typically used for their portability features where the user can carry the terminal in one hand and operate it with the other.

Many of today's computer systems can be hooked up to the Internet or the World Wide Web (WWW) being a part of the Internet. More and more of these devices draw at least part of their functionality from the Internet or WWW. A connection to the Internet or WWW can be established using Ethernet, Token Ring, or other wire based or fiber based schemes. Details and implementations of these schemes are well known in the art and are thus not addressed herein in detail.

Likewise, wireless ad-hoc connections schemes (e.g. body networks, radio frequency connections, or infrared connections) can be used to hook up a computer system to a network. Ad-hoc connections are required where devices move around, enter an area and exit the area. The term ad-hoc refers to the need for frequent network reorganization.

There are different wireless communications approaches known that have been developed and designed with an eye on the communication between peers or subsystems of such wireless ad-hoc networks. Typical examples are addressed in the following.

GTE Corporation has developed a short-range radio-frequency (RF) technique which is aimed at giving mobile devices such as cellular phones, pagers and handheld personal computers (PCs) a smart way to interact with one another. GTE's technique is tentatively named Body LAN (local area network). The original development of Body LAN was via a wired vest with which various devices were connected (hence the name Body LAN). This graduated to an RF connection a couple of years ago.

Xerox Corporation has developed a handheld computing device called PARC TAB. The PARC TAB is portable yet connected to the office workstation through base stations which have known locations. The PARC TAB base stations are placed around the building, and wired into a fixed wired network. A device can thus be connected through the PARC TAB base station to the Internet or WWW.

In an attempt to standardize data communication between disparate PC devices several companies, including Ericsson, IBM, Intel, Nokia, and Toshiba established a consortium to create a global standard for wireless RF-based connectivity between fixed, portable and mobile devices. There are many other adopter companies. The proposed standard comprises an architecture and protocol specifications ranging from the physical layer up to the application layer. Enabling seamless voice and data transmission via wireless, short-range radio, the Bluetooth technology will allow users to connect a wide range of devices easily and quickly, without the need for cables, expanding communications capabilities for mobile computers, mobile phones and other mobile devices. The Bluetooth operating environment is not yet fully defined, but there are expected to be similarities with the IrDA (Infrared Data Association) specification and the Advanced Infrared (AIr) specification. Other aspects that probably will find their way into Bluetooth might stem from the IEEE standard 802.11 and/or HIPERLAN, as promulgated by the European Telecommunications Standards Institute (ETSI).

Bluetooth radio technology provides a mechanism to form small private ad-hoc groupings of connected devices away from fixed network infrastructures. A link to a fixed network, such as the Internet or WWW might be provided. Further details can be found in Haartsen, Allen, Inouye, Joeressen, and Naghshineh, "Bluetooth: Vision, Goals, and Architecture" in the Mobile Computing and Communications Review, Vol. 1, No. 2. Mobile Computing and Communications Review is a publication of the ACM SIGMOBILE.

HomeRF (based on Shared Wireless Access Protocol (SWAP)) is another example of an operating environment which can be used to connect devices. A HomeRF Working Group was formed to provide the foundation for a broad range of interoperable consumer devices by establishing an open industry specification for wireless digital communication between PCs and consumer electronic devices anywhere in and around the home. The working group, which includes the leading companies from the personal computer, consumer electronics, peripherals, communications, software, and semiconductor industries, is developing a specification for wireless communications in the home called the SWAP. The HomeRF SWAP system is designed to carry both voice and data traffic and to interoperate with the Public Switched Telephone Network (PSTN) and the Internet or WWW; it operates in the 2400 MHz band and uses a digital frequency hopping spread spectrum radio. The SWAP technology was derived from extensions of existing cordless telephone (DECT) and wireless LAN technology to enable a new class of home cordless services. It supports both a time division multiple access (TDMA) service to provide delivery of interactive voice and other time-critical services, and a carrier sense multiple access/collision avoidance (CSMA/CA) service for delivery of high speed packet data. The SWAP system can operate either as an ad-hoc network or as a managed network under the control of a connection point. In an ad-hoc network, where only data communication is supported, all stations are equal and control of the network is distributed between stations. For time critical communications such as interactive voice, the connection point—which provides the gateway to the PSTN—is required to coordinate the system. Stations use the CSMA/CA to communicate with a connection point and other stations. Further details about HomeRF can be found at the Home Radio Frequency Working Group's web site http://www.homerf.org. The SWAP specification 1.0 is incorporated by reference in its entirety.

It is a well known problem that computer systems, and in particular portable computers, are expensive and thus tempting to steal. There is also the likelihood that such devices get lost or that the owner or user forgets a device when traveling, for example.

There are a few protection mechanisms, like passwords, that are not widely used because of the added burden they impose on the user. An alternative to password-protection is to use a dedicated central registry on a network where devices periodically send "hello" messages together with their own address, in order to track stolen or lost devices. This alternative is vulnerable to firewalls because the "hello" messages going to the central registry can easily be intercepted by a firewall filter, since the central registry's well-known address must be carried in these "hello" messages.

It is an object of the present invention to provide a scheme enabling the discovery of a lost or stolen computer system.

It is another object of the present invention to provide systems enabling the discovery of a lost or stolen computer system.

Yet another object of the present invention is to provide a scheme or system enabling the discovery and subsequent tracking of a lost or stolen computer system.

SUMMARY OF THE INVENTION

The present invention concerns a scheme for the discovery of lost or stolen computer systems. A network-attachable computer system, according to the present invention, comprises a network interface for connection to a network, a server module address, a secure identifier, and a key (e.g. an encryption key). The computer system generates identity information which comprises the secure identifier and which is protected using the key. This identity information is automatically sent via the network interface to a server module which is reachable via the network by using said server module address.

A network system, according to the present invention, comprises a computer system, a network, and a server module. The computer system has a network interface for connection to the network, a server module address, a secure identifier, and a key. The server module is reachable through the network at the server module address. It has access to a list with secure identifiers and the corresponding decryption keys of lost or stolen computer systems. The computer system generates identity information which comprises the secure identifier and which protected using said key. This identity information is automatically sent via the network interface to a server module which is reachable via the network by using said server module address. The server module compares the secure identifier with said list to determine whether the secure identifier is on said list. If this is the case, then the server module verifies whether the identity information was sent by the computer system by using the corresponding decryption key. If the secure identifier is on the list and if this verification reveals that the identity information was sent by said computer system, then the server module triggers an action.

A server module, according to the present invention, comprises an access to a list with secure identifiers and the corresponding public encryption keys of lost or stolen computer systems, and a network interface for connecting it via a network to a computer system. The server module receives identity information with a computer system's secure identifier and which is protected by a key. The server then compares the secure identifier with the list to determine whether the secure identifier is on said list. If the secure identifier is on said list, then the server module verifies whether the identity information was sent by the computer system by using the corresponding decryption key to process the signature. It then triggers an action if the secure identifier is on the list and if the verification reveals that the identity information was sent by this computer system.

A computer program product, according to the present invention, comprises a computer readable medium which has thereon computer program code means. The computer program code means, when loaded, make a computer system which comprises a network interface for connection to a network, a server module address, a secure identifier, and a key, execute the following procedure. It generates identity information comprising the secure identifier and being protected using the key. Then, it automatically sends the identity information via the network interface to the server module which is reachable via a network by using the server module address.

A computer program element, according to the present invention, comprises computer program code means to make a computer system which comprises a network interface for connection to a network, a server module address, a secure identifier, and a key, execute the following procedure. It generates identity information comprising the secure identifier and being protected using the key. Then, it automatically sends the identity information via the network interface to the server module which is reachable via a network by using the server module address.

A computer system, according to the present invention, comprises a network interface for connection to a network, a server module address, a secure identifier, a key, and a module for generating identity information comprising the secure identifier and being protected using the key. This module automatically sends the identity information via the network interface to the server module which is reachable via a network by using the server module address.

A server module, according to the present invention, has access to a list with secure identifiers and corresponding decryption keys of lost or stolen computer systems, and comprises a network interface for connection it via a network to a lost or stolen computer system. Furthermore, it comprises means for receiving identity information—which comprises said secure identifier and which is protected using said key—via the network and said network interface, and means for comparing said secure identifier with said list to determine whether said secure identifier is on said list, and, if said secure identifier is on said list, for verifying whether said identity information was sent by said computer system by using said corresponding decryption key, and for triggering an action if said secure identifier is on said list and if said verification reveals that said identity information was sent by said computer system.

The present scheme builds on web sites or other services of the network to which the access is important. The web-sites could be portals (like altavista, amazon.com, yahoo, icq, etc), or internet-banking web-sites, or any other web-site of interest. Among the other services that can be enabled with the present scheme, DNS (Domain name service) is also a candidate.

In each case, an appropriate protocol has to be used, like HTTP or secure-HTTP for the web-sites. Therefore no filtering can be done to selectively disable the present detection process, without disabling access to all the important services above as well.

The present scheme consists of a client part running in the computer system to protected, and a server module located for instance in the web-sites, from where registries of the stolen devices can be accessed.

A computer system according to the present invention is given a secret encryption key, together with a unique identifier (ID). The secret key can be used to authenticate the ID. In accordance with the present invention, a list of web-sites or other services (with DNS names, and/or IP addresses, or GSM phone number, etc.) is also included in each computer system. The computer system according to the present is enabled to do data exchanges with the server module.

Devices according to the present invention do not necessarily have to have identical implementations (from a software and/or hardware point of view) as long as at least the present scheme for announcement of the identity information is implemented in these devices.

The present scheme relies on two important observations:

High-tech devices (herein called computer systems) usually cannot be easily dismantled into spare parts without loosing a considerable value. Therefore a mechanism protecting the central piece of the computer system (like the motherboard of a portable computer) is a strong enough deterrent against theft. If needed, other expensive pieces that can be easily separated from the central piece (like graphic adapter cards, network interface cards, CPUs or modems) can be protected independently using the present scheme.

A denial of network-access (to the Internet or to other networks, like GSM) diminishes dramatically the functions the computer system can offer, and therefore the value of such a stolen computer system. Network-access is becoming a required feature for more and more computer systems, not only for high-tech computer systems or networking devices themselves, but also for vehicles equipped with a navigation-system for instance.

BRIEF DESCRIPTION OF THE DRAWINGS

The invention is described in detail below with reference to the following schematic drawings. It is to be noted that the Figures are not drawn to scale.

DETAILED DESCRIPTION OF PREFERRED EMBODIMENTS

Figure 1:
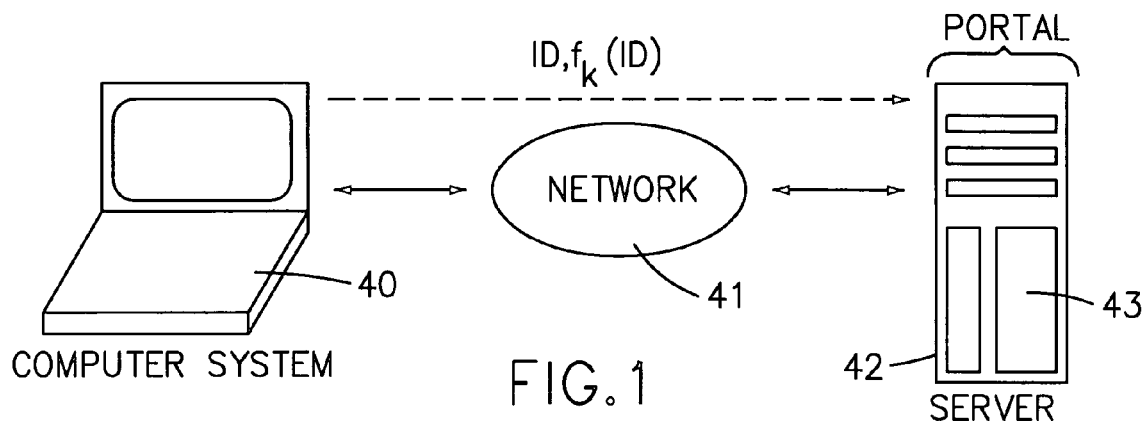
FIG. 1 is a schematic block diagram used to describe the basic concept of the present invention.

The present scheme can be used in wireless networks, wire-based networks or fiber-based networks which are deployed in warehouses, on manufacturing floors, in offices, on trading floors, in private homes, in cars and trucks, in airplanes, and outside of buildings, just to mention some examples. Any kind of network, including the Internet and WWW, is meant when herein referring to a network.

When referring to a computer system, any kind of device is meant that can be attached or hooked up to a network. Examples of computer systems are: laptop computers, workpads, notepads, personal digital assistants (PDAs), notebook computers and other wearable computers, desktop computers, computer terminals, networked computers, internet terminals and other computing or networking systems like bridges, switches, routers, and set-top boxes, cash registers, bar code scanners, point of sales terminals, kiosk systems, cellular phones, pagers, wristwatches, digital watches, badges, and smart cards. Other contemplated devices include: headsets, Human Interface Device (HID) compliant peripherals, data and voice access points, cameras, printers, fax machines, keyboards, joysticks, HiFi systems, audio (sound) cards, loudspeakers, amplifiers, video cards, kitchen appliances, tools, sensors such as smoke and/or fire detectors, and virtually any other digital device.

Other examples of wearable computers that can be used in connection with the present invention are, personal effects being equipped with computer-like hardware, such as a "smart wallet" computer, jewelry, or articles of clothing. In addition to a "smart wallet" computer, there are a number of other variations of the wearable computers A "belt" computer is such a variation which allows the user to surf, dictate, and edit documents while they are moving around. Yet another example is a child's computer which is comparable to a personal digital assistant for grade-school children. The child's computer might hold assignments, perform calculations, and help kids manage their homework. It can interface with other children's computers to facilitate collaboration, and it can access a teacher's computer to download assignments or feedback. Any wearable or portable device, any office tool or equipment, home tool or equipment, system for use in vehicles, or systems for use in the public (vending machines, ticketing machines, automated teller machines, etc.) might comprise the present invention.

For the purpose of the present invention also cars, trucks, and any other vehicle that comprises kind of a computer system are considered to be a computer system in the broadest sense. In other words, the present invention can also be employed to discover and, if desired, track down stolen vehicles.

It is furthermore assumed that a computer system, as used in connection with the present invention, has a minimum amount of processing power that enables it to communicate with a network. These computer systems are thus herein referred to as network-attached (or network-attachable) computer systems. The network-attached computer systems needs to be able to transmit information to a network and/or receive information from a network.

A server module, as employed in connection with the present invention, can be a dedicated server or a module within a server, a computer system connected to a network, or a switch, router, bridge or any other network device which has some processing power that enables it to communicate with a network and to perform the steps of the present invention. A farm of computer systems can be employed as server module. Ideally, the server module is part of or connected to a portal. A portal is a web-site acting as an entry-point to the Internet, like a search-engine, a news service, banking web-site, etc. Preferably, portals are employed in connection with the present invention that are visited by many people. An ideal place for the server module is a portal that is very popular because of the services offered. The more people connect to the portal the more likely it is that also the lost or stolen system is used to establish a connection to it. If the server module, according to the present invention, is placed on or at a portal then it is not possible to for the user of a computer system, for a firewall, or a packet filter to distinguish between data exchanged for the purpose of completing the steps of this invention and data exchanged to browse the services or information offered by the portal. This makes the invention much more robust compared to approached based on centralized well-known dedicated servers.

Secure identifier: A key element of the present invention is a so-called secure identifier. Any kind of identifier can be used to identify the computer system to a server module. The word secure is used herein to indicate that the identifier cannot be changed or acted upon by a non-authorized person or system. Ideally, the identifier is unique within the network. The identifier can be set by the manufacturer who makes the computer system or the store where the system is sold. There are different approaches that can be used to protect the identifier while it is transmitted over the network. The secure identifier, after being signed by an encryption key, is sent as so-called identity information across the network to the server module. One preferably uses a secure identifier which is optimized so that the transmissions across the network are efficient. In addition to the identifier, the identity information might comprise a time stamp and other information that is useful for the signature (e.g. a random sequence of bits). The identifier can be encrypted prior to transmission (2nd approach). For this purpose, the computer system may take the portal's public encryption key and use it to encrypt its identifier before sending it across the network. There are other ways for the encryption of the identifier.

Encryption key: If the identifier is signed using an encryption key, or of the identifier is encrypted prior to its transmission to the server, then a computer system according to the present invention comprises an encryption key. This encryption key can be a private encryption key as used in connection with known public key encryption algorithms. Preferably, the encryption key assigned to a particular computer system is secret, which means that nobody should have access to this key in combination with the computer system's secure identifier.

Server module address: The server module has an address. This module's address is stored in a computer system according to the present invention. Preferably, the server module address (e.g., a unicast address) is stored together with the secure identifier and the encryption key. Nobody should have access to this server module address. The server module address is used for sending identity information from a computer system via the network to the server module. The server address could also be a multicast or anycast address. Instead of using a server address that is know to the computer device, a dynamic learning scheme could be employed whereby the computer system monitors incoming and/or outgoing traffic to obtain a server address.

Network topology: The present scheme can be used in connection with any kind of network which at least allows the computer system to send information to a server module. The network topology is lower-level than the subject of the present invention. Aspects of the network topology are only addressed to the extent necessary, i.e., the present invention is independent of the network topology.

Network technology: The present scheme can be used in connection with any kind of network technique, such as Ethernet, Token Ring, ATM, RF, IR, and the like.

Announcement of Identity Information: An example of a scheme for announcement of the identity information is now addressed. A computer system can send from time to time, e.g., at random or regular intervals, identity information to a specific server module which is reachable via a network. The announcement could also be sent each time the computer system is connected to a network, for example. The address or identity of this server module (server module address) can be kept inside said computer system in form of an address list, for example. The DNS (Domain Name System) information of server modules could for example be hard-coded inside the computer's hardware. Likewise, it might be provided in a hidden file or in a hard disk partition of the computer system. If no address is provided in the computer system, the address can be learnt dynamically on-the-fly. The present invention is independent of the scheme for announcement of the identity information. What is required is that a computer system according to the present invention announces its identity information to a specific server module. How this is done and how often the announcement is repeated is implementation dependent.

Before addressing detail embodiments of the invention, the underlying scheme is addressed and additional terms are defined. A typical network system is illustrated in FIG. 1. There is a computer system 40 (e.g., a notebook computer) which is connected via a network 41 to a server module 42. For sake of simplicity the network 41 is represented in form of a simple cloud because the structure, type, and size of the actual network is not of relevance. In other words, any kind of network 41 can be used to link the computer system 40 to a server 42 module. The computer system 10 comprises the address of a server module, a secure identifier (ID) and a corresponding encryption key k. From time to time, the computer system 40 announces its identity to the server module 42. The identity is announced by transmitting so-called identity information which comprises the secure identifier (ID) of the computer system 40. To allow a verification of the computer system 40 by the server module 42, the identity information is signed using the encryption key k, as indicated by the expression $f_k(ID)$. This is important because otherwise an unauthorized third party (e.g., an intruder or hacker) could misuse the identifier of a specific computer system. Such a misuse can be prevented if the identifier is signed using an encryption key k.

The server module 42 sits on a portal or is attached or linked to a portal and comprises a list 43 or has access to a list with the secure identifiers of computer systems that are deemed to be stolen or lost. Furthermore, the server module 42 knows the corresponding public encryption keys for each such computer, or the server module 42 has access to the corresponding public encryption keys, e.g., through another server. If the server module 42 receives an announcement with the identity information of a computer system 42, it compares the identifier (ID) conveyed in said identity information with the identifiers in the list 43. If there is a corresponding entry in said list 43, then this is a first indication that the respective computer system (i.e., the computer system that carries the respective ID) was reported stolen or lost. In a next step, the server module 42 then uses the public encryption key k which corresponds to the ID to verify whether the received identity information really came from the lost or stolen computer system. If the verification fails, then it is to be assumed that an unauthorized third party misused the ID of a computer system. If the result of the verification is positive, then the corresponding device is identified with a high degree of certainty. In other words, the stolen or lost computer system was discovered.

In a subsequent optional step, an action might be triggered to track down the discovered computer system, to inactivate it, to cancel certain services, to change user passwords, or the like. Details will be described later.

Figure 2A:
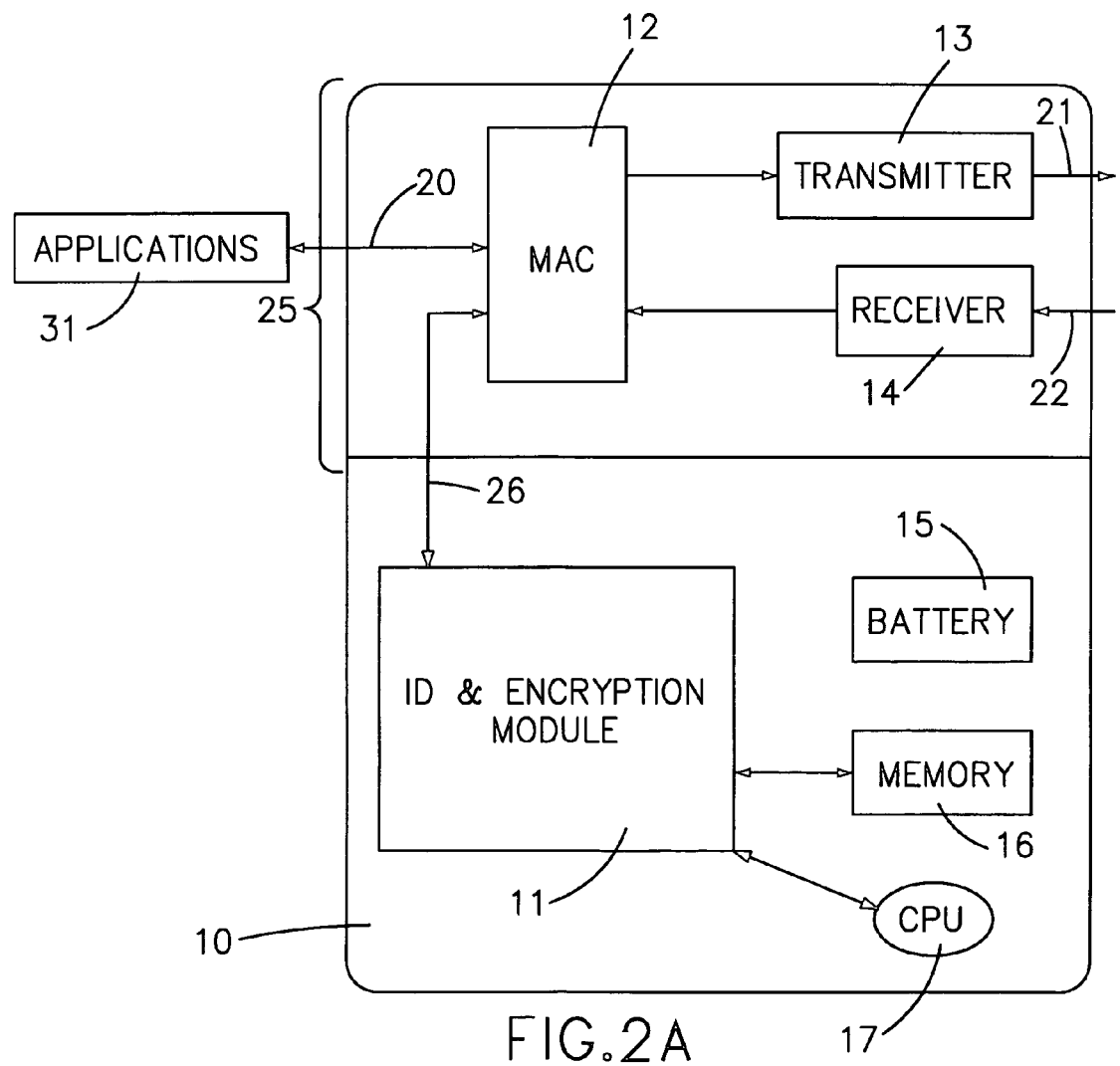
FIG. 2A is a schematic block diagram of an embodiment, in accordance with the present invention.
Figure 2B:
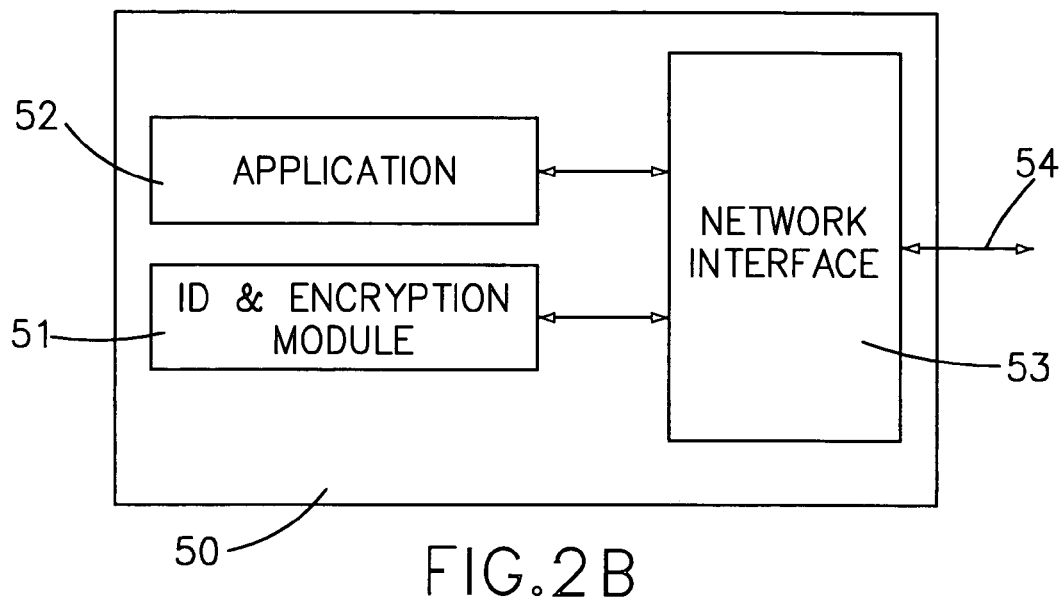
FIG. 2B is another schematic block diagram of an embodiment, in accordance with the present invention.
Figure 2C:
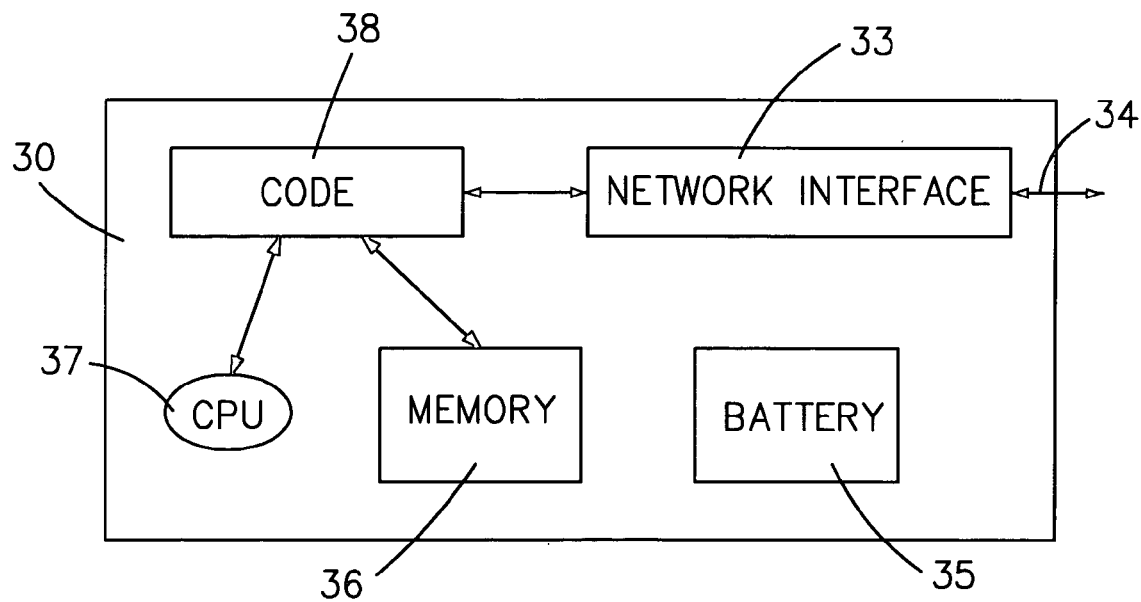
FIG. 2C is another schematic block diagram of an embodiment, in accordance with the present invention.

A computer system 10, in accordance with the present invention, might comprise the building blocks illustrated in FIGS. 2A, 2B, and 2C. The computer system 10 has a network interface unit 25, a special module 11 which represents the present scheme for announcement of identity information and use of encryption. This module 11 is herein referred to as ID & encryption module or client (note that this module might be a logical module). In addition, the system 10 might comprise an application 31, e.g., an application program, being executed by the computer system 10. The network interface unit 25 typically comprises a transceiver (e.g. composed of a transmitter 13 and a receiver 14) which communicates with a medium access control (MAC) unit 12. The MAC layer is well defined by international standards (cf. ISO OSI (Open Standards Interconnection)

reference model as described in A. S. Tannenbaum's book "Computer Networks", for example) and the MAC unit 12 might be a conventional unit employed in communication systems to control the MAC layer. Note that a MAC layer is a logical division, and would be only logically divided from other parts of the protocol implemented at 11 or somewhere else on the same physical device. The MAC unit 12 might be employed to detect and/or avoid collisions. In the present embodiment the MAC unit 12 is used to send information to the network and receive information from the network.

The transmitter 13 sends information via an output channel 21 through a network to another device (e.g., a portal with a server module 42), and the receiver 14 receives through an input channel 22 information from another device. Note that in the present example there are two channels 21, 22 shown. These channels can be any kind of channels (including broadcast channels), such as a fiber channel, an IR channel, or RF channel, for example. It is conceivable that there is more than one network interface unit 25. These units need not be the same. It is conceivable that these units have different types of channels, such as an IR channel or RF channel.

In addition to the network interface unit 25 the computer system, 10 has a power supply. In the present example the power is provided by a battery 15. Likewise, the power might be provided by via a power plug, a solar cell, or the like. The power supply provides power to the components of the computer system 10. For sake of simplicity, the respective circuit lines or cables are not shown in FIG. 2A.

The secure identifier (ID) is fed from the ID & encryption module 11 via line 26 to the MAC unit 12. The ID & encryption module 11 is connected to a memory 16 and a central processing unit (CPU) 17. The ID & encryption module 11 might communicate by means of application programming interfaces (APIs) with other units.

Note that the MAC 12 and/or the ID & encryption module 11 can be logical constructs. They could be implemented on separate devices, but they can equally well be incorporated into a program stored in the memory 16. If incorporated into a program, the computer system 10 might physically be the same as any other conventional device, except for the fact that it comprises the above-mentioned program. This program comprises instructions that, if processed by the CPU 17, make the computer system 10 perform the steps according to the present invention.

The ID & encryption module 11 implements at least part of the present scheme, allowing the computer system 10 to announce its identity to a server module. In addition, the ID & encryption module 11 employs a secret encryption key for signing the transmission of the identity information. This allows later verification by the server module. Identity information refers to the information needed to identify the computer system 10 and to verify the computer system's identity. Note that FIGS. 2A, 2B, and 2C do not represent all elements of a fully functional system.

Figure 3:
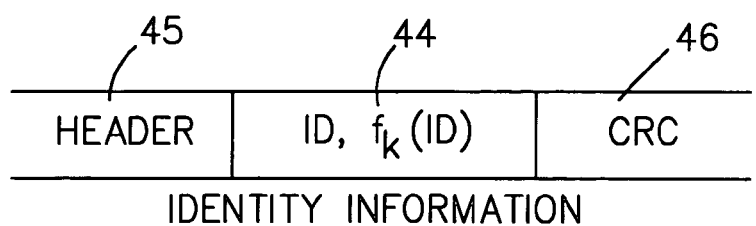
FIG. 3 is frame or packet as used in connection with the present invention.

FIG. 3 is a schematic representation of a frame or packet with identity information 44 that is transmitted by a computer system connected to a network to announce its identity to a server module. The frame or packet at least comprises the secure identifier (ID). The identity information 44 is signed using the secret encryption key k. Depending on the MAC scheme used to avoid collisions, the frame or packet might comprise a MAC layer header 45, for example. MAC layer headers are standardized and well known in the art. The MAC layer header 45 might comprise information (e.g. the server module address) to identify the destination of the identity information 44, and might also contain other information fields (for security control, medium access management, etc.). The identity information 44 might be spread across multiple MAC packets or frames. A cyclic redundancy field 46 might be used to ensure proper transmission of the packet or frame. Please note that FIG. 3 shows a typical example of a packet or frame. There are many different ways to build such frames. Note that in the case of the Internet for example, there will be an IP header also behind the MAC header.

A second embodiment of the present invention is shown in FIG. 2B. The computer system 50 is a general purpose computer (e.g., a palm top computer) with a network interface 53 through which a network 54 can be linked. The computer system 50 comprises an ID & encryption module 51, that performs the steps of the present scheme. In addition, the computer system 50 may comprise an application that requires access to the network 54.

Another computer system 30 according to the present invention is shown in FIG. 2C. This computer system 30 comprises a network interface 33 through which it communicates with devices that are part of the network 34, or devices that can be reached through the network 34. The computer system further comprises a battery 35, a memory 36, and a CPU 37. The present invention is implemented in code 38 that, when executed by the CPU 37, controls the computer system 30 such that it performs the steps according to the present invention. Those skilled in the art will understand that the computer systems illustrated in FIGS. 2A, 2B, and 2C are examples of devices implementing the present invention. The configuration and construction of the various elements of these computer systems is based on well-known hardware and/or software. Those skilled in the art will recognize that many modifications and changes can be made to the particular embodiments described in connection with FIGS. 2A, 2B, and 2C without departing from the spirit and scope of the invention.

In the context of an IBM ThinkPad protected against theft, the scheme according to the present invention could be implemented as follows. Here an example is taken where portal web-sites participate in the scheme:

the ID & encryption module is located in the PCI bus controller of the ThinkPad, where it has access to all the data exchanged on the bus. This requires some code to be added into the PCI bus controller chip. The ID & encryption module runs a self-learning algorithm where it looks at the data exchanged on the bus. This allows the ID & encryption module to discover what IP address it has to use, on which PCI slot is the network interface connected, and other information.

the ID & encryption module is first in a "watch"mode, where it sends a "Hello" message to one of the portals in his list of web-sites or other services by opening an HTTP connection (this can be done periodically, or triggered by other events like the change of the IP address of the ThinkPad, but only when the ThinkPad is connected to a network). The "Hello" message contains the unique ID assigned to the ID & encryption module, the source IP address, the time and date, and a signature of this "Hello" message.

the server module is in the present example located on a portal, and it receives the "Hello" messages coming from the ID & encryption modules. If it detects a "Hello" message coming from a stolen or lost ThinkPad (the ID is in the stolen devices registry to which the server module has access, or a copy of which is comprised in the server module), it first verifies the signature. If the signature is correct, the server module communicates to the ThinkPad's ID & encryption module the actions to be taken.

The ID & encryption module then goes into the "alert" mode. It can for instance execute a "traceroute" command which returns all the hops on the path to the portal. This information (together with the user IDs that have been seen) can then be sent to the server module to help locate the lost or stolen ThinkPad.

The ID & encryption module stays in "alert" mode until the server module decides to remove this device from the stolen devices registry.

It is important that all devices that are supposed to participate in the discovery scheme according to the present invention support at least the service announcement protocol for the transmission of the identity information.

It is understood by those skilled in the art that at the present time many of the protocols that are suited for use in wireless communications systems are still in draft status. The present scheme is independent of any particular protocol and can be used in connection with many such protocols. Somebody skilled in the art is able to implement the present scheme in existing protocol environments as well as in protocol environments under development or yet to be developed.

Many computer systems require network access because they draw part or all of their functionality from the network which means that somebody who found the computer system or who uses it after it was stolen will sooner or later connect to the network. The present scheme then will send out the system's identity information to a specific server module. This server module determines whether the computer system was lost or stolen and then triggers an action. The present scheme cannot be disabled on the protected computer system without loosing considerable functionality.

Some computer systems are used in networks that are connected via a firewall to external networks. The present scheme is invisible to such firewalls or packet filters, which means that the identity information cannot be intercepted or filtered. This can be achieved through encryption of the packets sent to the server module (for instance using the secure-HTTP protocol), so that no intermediate device on the path to the server module can recognize that this packet is an identity announcement packet (i.e. a packet that comprises identity information). Since the server module is co-located with a portal no filtering can be done based on the IP destination address without impacting the regular data exchanges as well.

The present invention can be combined with portals such as search engines, main webservers, or Internet servers (e.g. Yahoo, AltaVista, or infoseek), or the like which are visited by millions of network users every day. The search engine can be modified such that the present scheme runs in the background so that the user does not notice what is going on behind the scenes. Since these kind of search engines and servers are accessed frequently, the time until a stolen or lost computer system is discovered is typically very short.

Note that the computer system's ID & encryption module can be composed of the identifier and a key (whereby this key is either needed for 1) signing the identifier, or 2) encrypting the identifier, or 3) watermarking) plus the program logic (computer code) that does the exchange with the server module. Ideally, both things are implemented into a single module.

The present scheme can be implemented in hardware such that it is independent of the operating system (OS). If one changes the OS, the present scheme is still functional. Even a reconfiguration of the whole system will not inactivate the present scheme. This can be achieved by hardwiring or programming a chip or component of the computer system to contain the secure identifier and run the appropriate exchanges with the server. The secure identifier and/or the program logic could for example be comprised in the PCI-bus controller, or in a chip on the computer's mother board (e.g., the CPU). The identifier and/or the program logic could also be kept inside a component of an interface card or module, such as a modem blade, for example. If the identifier is added to an existing computer component, e.g., a chip, the extra costs are negligible. The computer component that comprises the ID has to be able to access the network in order for the identifier to be transmitted to a server module. The component could be on the network interface itself, so that it does not need access to a computer bus. Or it could have its own wireless interface, so that it could be placed about anywhere in the computer system.

The computer component that comprises the ID, the server module address and the secret encryption key should be tamperproof. Otherwise, if the secret encryption key, or the server module address, or the ID are modified, then failures to authenticate the announcement of identity would occur and the present scheme would not be operational anymore.

The highest security is achieved by having a chip or other component inside the computer device which is to be protected. That component or chip must be able to look at data exchanged with the network interface(s). A learning process could be employed to allow the component or chip to create an HTTP packet or other kind of frame which once it is sent cannot be distinguished from the packets or frames generated by the normal use of the computer system. If this approach is used, no firewall or other packet filter will be able to intercept the respective identity information.

The identifier can also be included in a software module in the OS, or in the BIOS. Using a software module gives more flexibility for the price of a lower level of security because the OS or software can be modified to deactivate the present scheme.

Examples of actions that can be taken once a stolen or lost computer system was discovered are now addressed. It is obvious that this list of actions is non-exhaustive. Different business models could be developed around the present invention. The more expensive a device is, the more likely it is that the tracking of the stolen or lost system makes sense.

One could use a trace route mechanism to track down the path to the computer system that was discovered.

Stolen devices once detected can participate to identify and/or locate the thief or current user silently.

The real owner of a computer system could be notified. The police or another organization could be engaged to track the computer system.

The Internet Service Provider through whom the discovered computer system is used can be contacted to take action, e.g. by inactivating the respective account.

Stolen computer systems once detected can be refused access to sensitive services, like internet-banking. This is particularly useful since portable computer systems very often contain private information on bank accounts.

A feature in the stolen or lost computer system could be activated which destroys the whole system or part thereof to make it unusable. This is a good solution for systems which are not expensive because tracking down such a system might be too expensive. The real owner might be furnished with a password or key which allows him to reactivate the computer system that was made unusable.

a global positioning system (GPS), if available in the lost or stolen device, can be activated to enable the tracking of it by transmitting coordinates describing the systems position. A typical example is a mobile phone or a vehicle with a GPS.

The computer system can be triggered to send configuration information to the server module, or to a third party, e.g. the police. As part of the configuration information the user name, Internet service provider numbers, phone number, and IP address can be transmitted.

The computer system can be caused to show an alert screen, or the sound system can be employed to activate an alarm signal.

An alert message can be appended to e-mails that are sent out from the computer system.

An alert message could be inserted in the HTTP request header field of HTTP requests to notify somebody.

If the computer system has a GSM access to a public network, the outgoing calls cannot be filtered based on their destination address. In this case it is possible to use specific servers instead of portals that are used otherwise.

The server can send information back to the computer system to cause the system to perform certain functions. This information is transmitted in encrypted form.

Other schemes are conceivable that allow silently to find or identify the thief or user who found a computer system.

If somebody buys a computer system that supports the present discovery scheme he can register with a service provider who offers a discovery service. If he does so, an encryption key will be assigned to the computer system. Preferably, the secret encryption key is put in the computer system together with the secure identifier at manufacturing time.

The present invention can be implemented by or on a general or special purpose computer. A computer program or computer program means in the present context mean any expression, in any language, code or notation, of a set of instructions intended to cause a device having an information processing capability to perform a particular function either directly or after either or both of the following a) conversion to another language, code or notation; b) reproduction in a different material form.

The public encryption key which corresponds to the key that was assigned to the computer system can be kept at a safe location for later use. A certificate which authentifies the public key with the secure identity is given to the owner. Only if the computer device is reported stolen or lost by the user, the public encryption key may be made available to the server that receives the identity information, together with the certificate. Records that allow the service provider or system to identify the real owner can be kept separate from the list of stolen or lost systems to make sure that this information is not misused. Such records can be controlled and/or maintained by the police or other trusted parties.

Besides the already described embodiments the present scheme can also be implemented using a broadcast facility for computer systems that are connected to a broadcast network. In this way the present scheme becomes server driven. The secret encryption key in this case would belong to the server. Information about stolen or lost computer systems will be broadcasted in certain time-intervals over the broadcast media. In order to prevent somebody from turning the method off the identity information will be sent on a control channel. So if this control channel is interrupted then the particular user will not be able to make use of the broadcast facility anymore. The mobile computer system snoops for the list of stolen or lost computer systems.

It is conceivable that many computer systems that are sold in the future comprise the inventive feature. If an owner does not like this feature he can have it deactivated if the feature is as a default setting switched on, or somebody who wants to use this feature can have it activated if as a default setting it is switched off. Preferably, this is done only once at manufacturing time (otherwise it would be less resistant to hackers).

The present scheme protects the privacy of owners or users of computer systems and at the same time allows to discover lost or stolen devices. The use of an identifier (ID) on each system and the fact that this identifier is transmitted across a network is no intrusion into the owner's or user's privacy because the identifier is protected using one of the following approaches: 1) the identifier can be sent in the clear being signed by an encryption key; 2) the identifier can be encrypted using an encryption key; or 3) the identifier can be sent as kind of a watermark within a data flow. In this case an appropriate key, such as a watermarking algorithm, is used. Only if processed with the corresponding key (e.g. a public encryption key) the identity information can be decrypted. Even after decryption only the system's identifier is revealed and the source of the identity information has been verified. In a subsequent step one might use a separate record that allows to identify the owner or user of a computer system. This record can be controlled or maintained by a third party, such as the police. Certificates can be use to protect the interactions between the owner or user and this third party.

It is an advantage of the present scheme that it cannot be disabled without having the functionality of the stolen computer system significantly reduced, if not totally.

Theft of protected computer systems becomes therefore practically pointless.

The invention has been described with reference to the preferred embodiments. It will be understood by one having skill in the relevant art that modifications can be made to the embodiments as described without departing from the spirit and scope of the invention as set forth in the appended claims.

What is claimed is:

1. A method for discovering a network-attachable computer system which comprises a network interface for connection to a network, a server module address, a secure identifier, and a coded key, whereby a server module is reachable through said network at said server module address, said server module being co-located at a portal at a non-dedicated network component and having access to a list with secure identifiers and corresponding decryption keys of lost or stolen computer systems, the method comprising the steps of:

generating identity information comprising said secure identifier and being protected using said coded key; and automatically sending said identity information via said network interface to a server module co-located at a portal which is reachable via said network by using said server module address as part of an IP destination address;

comparing at said server module said secure identifier with said list to determine whether said secure identifier is on said list, and, if said secure identifier is on said list, verifying whether said identity information was sent by said computer system by using said corresponding decryption key, and triggering an action if said secure identifier is on said list and if said verification reveals that said identity information was sent by said computer system.

2. The method of claim 1, wherein said secure identifier can only be changed by an authorized person or system.

3. The method of claim 1, wherein said secure identifier is unique within said network.

4. The method of claim 1, wherein said identity information comprises at least a time stamp.

5. The method of claim 1, whereby said identity information is sent to said server module at random.

6. The method of claim 1 wherein said identity information is sent to said server module at regular intervals.

7. The method of claim 1 wherein said identity information is sent to said server module each time said computer system is connected to said network.

8. The method of claim 1, whereby there is a record that enables the identification of a legitimate user of said computer system.

9. The method of claim 8, whereby said record is controlled by another party.

10. A method in a server module for discovering a lost or stolen computer system which comprises a secure identifier, and a coded key, said server module being co-located at a portal at a non-dedicated network component and having access to a list with secure identifiers and corresponding decryption keys of lost or stolen computer systems, and being connected via a network interface to a network and said lost or stolen computer system, the method comprising the steps of:
receiving identity information comprising said secure identifier and being protected using said coded key via said network and said network interface;
comparing said secure identifier with said list to determine whether said secure identifier is on said list, and, if said secure identifier is on said list, verifying whether said identity information was sent by said computer system by using said corresponding decryption key; and
triggering an action if said secure identifier is on said list and if said verification reveals that said identity information was sent by said computer system.

11. The method of claim 10, whereby said server module comprises said list with secure identifiers and corresponding decryption keys.

12. The method of claim 10, whereby said list with secure identifiers and corresponding decryption keys is located on another server to which said server module has access.

13. The method of claim 10, whereby said action comprises at least one selected from the list consisting of tracking down said computer system; inactivating said computer system or part thereof; canceling certain services provided by said computer system; refusing said computer system's access to sensitive services; changing a password on said computer system; notifying the computer system's owner, the police, or a third party; triggering said computer system to send configuration information to a designated site; causing said computer system to show an alert screen; causing said computer system to issue an alarm; and causing said computer system to send out an alert message.

14. The method of claim 10, whereby said server module address is an Internet destination address.

15. The method of claim 10, whereby said portal is one of a search engine, a main webserver, and an Internet server.

16. A computer program product comprising a computer readable medium, having thereon computer program code means, when said program is loaded, to make a computer system which comprises a network interface for connection to a network, a server module address, a secure identifier, and a key, execute procedure comprising the steps of:
generating identity information comprising said secure identifier and being protected using said key, and automatically sending said identity information via said network interface to a server module which is co-located at a portal at a non-dedicated network component reachable via a network by using said server module address as part of an IP destination address, wherein said key is usable by said server module to verify that the identity information was sent by the computer system.

17. A computer program element comprising computer program code means for causing a server module to perform a method for discovering a lost or stolen computer system which comprises a secure identifier, and a coded key, said server module being co-located at a portal at a non-dedicated network component and having access to a list with secure identifiers and corresponding decryption keys of lost or stolen computer systems, and being connected via a network interface to a network and said lost or stolen computer system, the method comprising the steps of:
receiving identity information comprising said secure identifier and being protected using said coded key via said network and said network interface;
comparing said secure identifier with said list to determine whether said secure identifier is on said list, and, if said secure identifier is on said list, verifying whether said identity information was sent by said computer system by using said corresponding decryption key; and
triggering an action if said secure identifier is on said list and if said verification reveals that said identity information was sent by said computer system.

18. A computer system comprising a network interface for connection to a network, a server module address, a secure identifier, a key, and a module for generating identity information comprising said secure identifier and being protected using an encryption key, and for automatically sending said identity information via said network interface to a server module co-located at a portal at a non-dedicated network component which is reachable via a network by using said server module address as part of an IP destination address, wherein said key is usable by said server module to verify that the identity information was sent by the computer system.

19. A server module for discovering a lost or stolen computer system which comprises a secure identifier, and a key, said server module being co-located at a portal at a non-dedicated network component and having access to a list with secure identifiers and corresponding decryption keys of lost or stolen computer systems, and said server module comprising:
a network interface for connecting said server module via a network to said lost or stolen computer system;
means for receiving identity information, comprising secure identifier and which is protected using said key, via said network and said network interface;
means for comparing said secure identifier with said list to determine whether said secure identifier is on said list, and, if said secure identifier is on said list, for verifying whether said identity information was sent by said computer system by using said corresponding decryption key, and for triggering an action if said secure identifier is on said list and if said verification reveals that said identity information was sent by said computer system.

* * * * *